United States Patent Office
3,538,596
Patented Nov. 10, 1970

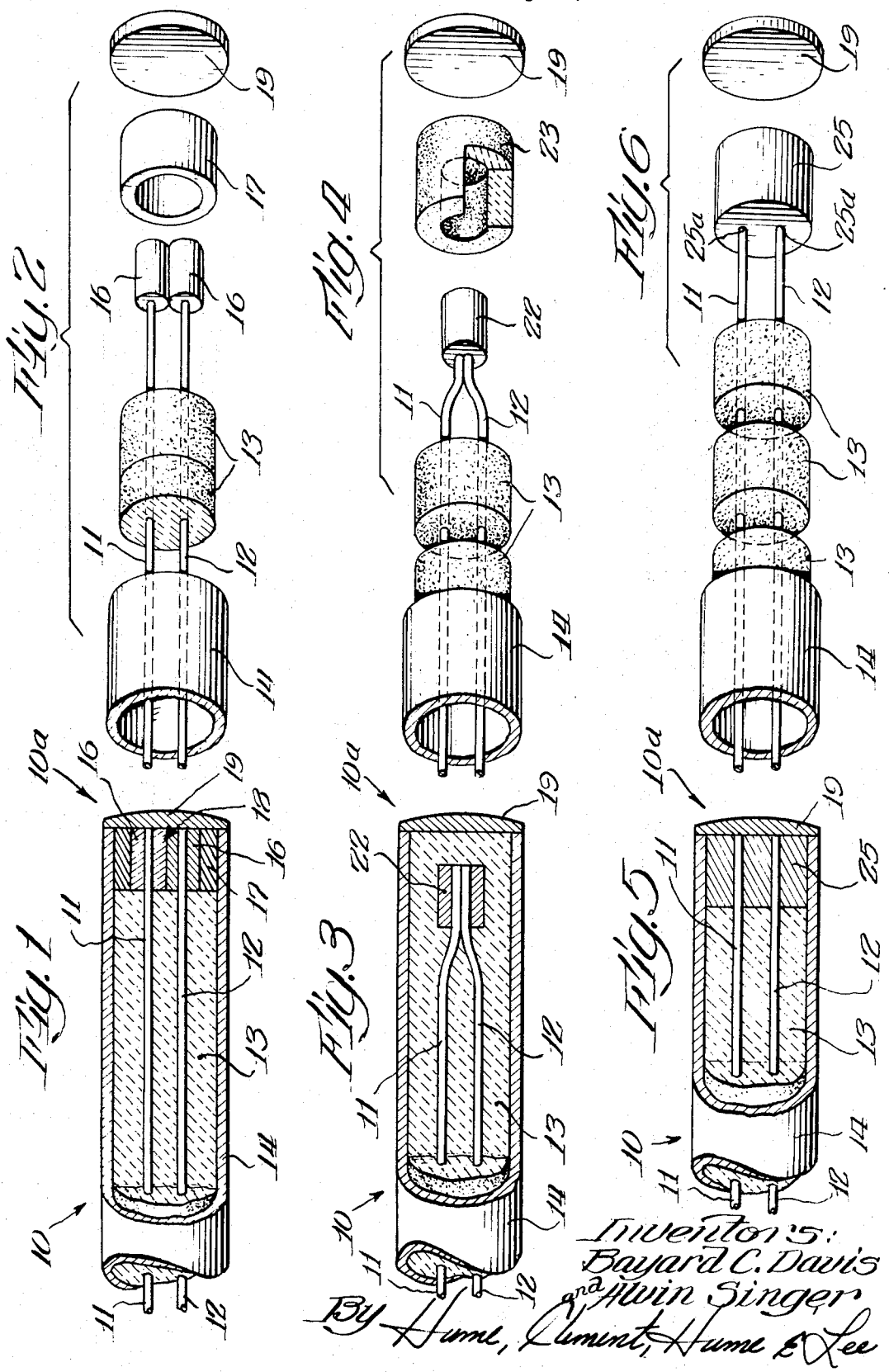

1

3,538,596
METHOD OF MAKING NON-WELDED THERMOCOUPLE JUNCTIONS
Bayard C. Davis, 425 S. Grace St., Lombard, Ill. 60148, and Alvin Singer, 1125 Hohlfelder Road, Glencoe, Ill. 60022
Original application July 28, 1965, Ser. No. 475,495. Divided and this application Oct. 22, 1968, Ser. No. 769,560
Int. Cl. H01v 1/04
U.S. Cl. 29—573  4 Claims

ABSTRACT OF THE DISCLOSURE

Methods for manufacturing non-welded thermocouple assemblies of a type specifically adapted for use in high temperature environments are disclosed. Specifically, an electrically conductive plug means is provided with a passageway of dimensions for easily receiving one end of a refractory metal thermocouple wire; after the wire and plug are longitudinally aligned, the plug is swaged into intimate engagement with the wire. A quantity of electrical insulating material of a refractory composition is placed about the remaining portion of the thermocouple wire to complete a sub-assembly that is inserted into a hollow electrically conductive refractory sheath with the plug at one end thereof and with the insulating materal maintaining the wire in spaced relation to the sheath.

CROSS-REFERENCE TO RELATED APPLICATION

The present application is a division of copending application Ser. No. 475,495, filed July 28, 1965 and assigned to the same assignee as the present invention.

INTRODUCTION

The present invention is directed to a method of manufacturing thermocouple junctions and more particularly to method for making non-welded, plug type junctions for the thermocouple elements of a couplete thermocouple assembly.

SUMMARY OF THE INVENTION

It is an object of the invention to provide an improved method of making a non-welded junction for the thermocouple elements of a metallic sheathed and insulated thermocouple assembly.

Still another object of the present invention is to provide both densely compacted and non-compacted (i.e. vitrified or high fired), grounded and ungrounded, non-welded, plug type junctions that are particularly suitable for use with refractory metal thermocouple wires or elements (i.e., thermoelements).

A further object of the present invention is to provide non-welded junctions for the thermocouple elements of an assembly, which junctions are readily and inexpensively formed and do not create substantial voids in or otherwise impart structural weakness to a completed assembly.

BRIEF DESCRIPTION OF THE DRAWINGS

Other objects and advantages of the present invention will become apparent from the following description of several preferred embodiments thereof, particularly when considered in conjunction with the accompanying drawing wherein:

FIG. 1 is a fragmentary view partially in cross-section which depicts one embodiment of a non-welded thermocouple junction constructed in accordance with the present invention;

2

FIG. 2 is a partially exploded view of the junction depicted in FIG. 1;

FIG. 3 is a view similar to FIG. 1 but illustrating another form of non-welded junction;

FIG. 4 is a partially exploded view of the junction shown in FIG. 3;

FIG. 5 is a fragmentary view, partially in cross-section, illustrating another embodiment of non-welded junction constructed in accordance with the present invention; and FIG. 6 is a partially exploded view of the junction illustrated in FIG. 5.

DESCRIPTION OF THE PREFERRED EMBODIMENTS

Referring generally to the drawing, the present invention contemplates both grounded and ungrounded, non-welded, plug type junctions for thermocouple assemblies, particularly metallic sheathed and insulated thermocouple assemblies employing refractory metal thermocouple elements. The supporting insulating medium of the assemblies may either be of the densely compacted type or may be a non-compacted vitrified insulating medium that is intimately surrounded and confined by the outer sheath.

In accordance with the invention, the thermocouple wires or elements (i.e. the thermoelements) are joined in electrical contact by means of a plug type junction that may either be insulated from or maintained in electrical contact with the metallic sheath of the thermocouple assembly. In one embodiment of the invention, the thermocouple elements are electrically joined to each other and to the metallic sheath in a grounded configuration by means of a plurality of tubular housing members that are swaged about and joined in integral physical contact with the ends of the thermocouple elements.

In another embodiment of the invention, the thermocouple elements are joined in direct electrical and physical contact by means of a single tubular member that is in turn housed within an insert of a ceramic insulating material or the like so as to be insulated from the metallic sheath of the completed assembly. Alternatively, another form of grounded thermocouple junction is constructed with the thermocouple elements having their junction-forming ends being confined within a single plug type element of metallic material which is joined to and maintained in electrical contact with the interior surface of the confining sheath of the completed assembly.

In both the grounded and ungrounded, non-welded junctions contemplated by the present invention for use particularly with refractory metal thermocouple elements, the difficulties typically caused by embrittlement of such elements and stemming from welding of the junctions (i.e., discontinuities at the junction when a completed assembly is put in use in a high temperature environment) are avoided. In addition, severe bending of the elements is unnecessary to create the desired non-welded junctions, and a completed assembly need not include void spaces which can also be a source of substantial difficulty.

FIGS. 1 and 2 depict a grounded form of non-welded thermocouple junction. As will be appreciated by those skilled in the art and as employed in the following description, the term "grounded junction" contemplates a thermocouple junction that is maintained in electrical contact with the sheath of the completed assembly. Referring to these figures, the thermocouple assembly 10, in a conventional manner, includes at least a pair of thermocouple elements or wires 11 and 12 that are confined within and maintained in spaced apart, electrically insulated relationship by a filler 13 of a suitable temperature resistant insulating material. The filler of insulating material that surrounds and confines the thermocouple wires 11 and 12 is in turn intimately surrounded by a metallic sheath 14 of a suitable material which is both impervious to moisture and resistant to the extremely high temperatures typically encountered by such a thermocouple assembly. As generally outlined above, the filler of insulating material may either be a densely compacted ceramic insulating medium or may consist of a plurality of adjacently disposed, non-compacted vitrified (i.e., high fired) pellets.

The metallic sheathed thermocouple assembly (sometimes termed a thermocouple wire or conductor), including the thermocouple elements 11 and 12, the filler 13, and the metallic sheath 14, is constructed so that only a portion of the assembly constitutes the thermocouple juncion (i.e., the "hot" junction for the completed assembly). That is, only the end portions of the thermocouple wires 11 and 12 are joined together adjacent the terminal end 10a of the assembly 10 so as to form the junction.

More specifically, the ends of the thermocouple wires 11 and 12 are each confined within a small metallic tube 16 that surrounds and intimately engages the end of the respective thermocouple wire. Preferably, the small metallic tubes 16, which are formed from a metallic material that is compatible with the other components of the assembly, are swaged about and in contact with the ends of the individual thermocouple wires. The small metallic tubes 16 are in turn confined within a large outer confining tube 17 formed of similar material that is preferably swaged about both of the smaller tubes, so as to form an intimate and structurally stable junction 18.

In accordance with the invention, the aforedescribed sub-assembly or junction 18 (i.e., including the tubes 16 and the outer confining tube 17) is preformed prior to the fabrication of the remaining portion of the thermocouple assembly 10. Accordingly, the tube 17 when swaged about the tubular elements 16 preferably provides an exterior diameter that allows the subassembly to be fitted within the sheath 14 prior to the final fabrication operations essential to producing a thermocouple assembly.

That is, after the subassembly is completed as described above, pellets of the ceramic material which form the filler 13 are, in a conventional manner, strung on the thermocouple wires 11 and 12 from the ends thereof opposite the junction 18. This partially fabricated assembly is then fitted within the exterior sheath 14 and the entire unit is swaged into a homogeneous assembly. Depending on the type of material comprising the filler 13, the final swaging of the sheath either densely compacts the insulating material or is brought into intimate confining relationship with the vitrified pellets.

In the illustrated embodiment, the thermocouple assembly is completed by an end cap or closure element 19 that is welded or otherwise suitably joined into the terminal portion of the completed assembly subsequent to the final swaging or other fabrication step employed to yield a completed unit that is free of void spaces, particularly in the region of the junction 18. As is obvious from the foregoing description, the outer confining tube 17 is maintained in electrical contact with the inner surface of the metallic sheath adjacent the end thereof so that a grounded junction is provided.

Referring to FIGS. 3 and 4, this embodiment of a non-welded, plug type junction contemplates an ungrounded junction wherein the thermocouple wires 11 and 12 are swaged into structurally stable contact within a single confning element or tube 22. Preferably, the free ends of the thermocouple wires 11 and 12 are placed inside the tube 22 in essentially parallel relationship. The tube is thereafter swaged about the ends of the wires in the manner shown in FIG. 3 so as to both minimize the angle of merger and maintain the departure of the thermocouple wires from the existing parallel arrangement to the region closely adjacent the tube 22.

In this alternate embodiment of an ungrounded junction it is desirable to effect positioning of the joined wires and tube in the central axial region of the final assembly so that a maximum amount of insulation is provided between the exterior surface of the metallic tube 22 and outer confining sheath 14. In this latter regard, a suitably apertured pellet 23 of a ceramic or other suitable insulating material is positioned over and surrounds the joined wires and tube that form the junction in the manner that the other pellets are strung on the parallel segments of the wires prior to the final fabricating steps as outlined above, whereby a structurally stable and unified assembly is provided.

The embodiment of FIGS. 5 and 6 is an alternate form of grounded non-welded junction in which individual thermoelement confining tubes (e.g., such as the tubes 16 and 17) and an external confining tube (e.g., such as the tube 17) are replaced by a single metallic plug 25 that is predrilled to accommodate the free ends of the parallelly disposed thermoelectric wires 11 and 12. More specifically, the plug 25, which is formed of a metallic material compatible with the outer components of a completed assembly, is preferably predrilled with a pair of parallel apertures 25a that are proportioned to receive the free or terminal ends of the thermocouple wires 11 and 12. In this embodiment and after the wires have been placed within the apertures 25a, the plug 25 is preferably swaged about the free ends of the wires so that a strong mechanical and continuous electrical bond is achieved. The completion of the assembly (i.e., the stringing of the pellets, the fitting of the sheath over the subassembly, the final fabricating steps, and the welded closure) is carried out as previously described.

In each of the three embodiments of non-welded junctions previously described in conjunction with FIGS. 1–6, a strong and structurally stable mechanical and electrical bond is achieved between the thermocouple wires of the assembly. Moreover, because of the nature of these junctions, the continuity of the electrical connection is insured throughout the operational life of the assembly and void spaces which can ultimately cause deterioration of the assembly are eliminated.

With reference to a specific embodiment of an assembly of the type illustrated in FIGS. 1 and 2, such a junction can readily be provided in a thermocouple assembly having an outside diameter as small as .040 inch and including two or more thermocouple wires formed from materials such as tungsten, rhenium, and molybdenum. In such an assembly, the diameter of the thermocouple wires is approximately .005 inch and the tubes 16 are accordingly selected with an inside diameter of .006 inch and an outside diameter of .011 inch. The outer confining tube 17 is proportioned with an inside diameter of .024 inch and an outside diameter of .035 inch. Upon completion of such a junction 18, pellets of a ceramic insulating material such as beryllium oxide are strung over the thermocouple wires and this sub-assembly is fitted within a metallic sheath formed of tantalum of molybdenum and having inside and outside diameters of .049 inch and .065 inch, respectively, prior to a final swagging operation.

For an exemplary assembly of the type depicted in FIGS. 3 and 4, the dimensions of the components and their material fabrication is preferably the same as the aforedescribed embodiment with the exception that the element 22 is formed with an outside diamter of .020 inch and has an inside bore of .011 inch in diameter to accommodate the thermocouple wires prior to fitting within the apertured region of the insulating plug 23, which is also preferably formed of beryllium oxide. In the embodiment of FIGS. 5 and 6, the apertured or bored plug 25 is preferably a solid member formed of tantalum or molybdenum, having an outside diameter of .035 inch so that it readily fits within the metallic sheath prior to the final fabricating operations.

It will be appreciated that the foregoing description is merely illustrative of the invention. Various modifications of the aforedescribed embodiments might be devised by those skilled in the art without departing from the invention, various features of which are set forth in the accompanying claims.

What is claimed is:

1. In the method of manufacturing a non-welded thermocouple assembly having at least one refractory metal thermocouple wire and of a type for use in high temperature environments, the improvement comprising the steps of:

providing a longitudinal interior passageway in an electrically conductive plug means which passageway is of a diameter such as to easily receive said refractory thermocouple wire;

inserting one end portion of said thermocouple wire into said passageway of said plug means to effect a predetermined longitudinal alignment therewith;

swaging said plug means into intimate mutual engagement with said one end portion of said aligned thermocouple wire;

placing a quantity of electrical insulating material of a refractory composition about the remaining portion of said thermocouple wire to complete a thermocouple subassembly;

and inserting said thermocouple subassembly into a hollow electrically conductive refractory sheath with said plug means positioned adjacent one end thereof and with said insulating material maintaining said wire in spaced relation to said sheath.

2. The method of claim 1 and further including the step of:

swaging said sheath into intimate engagement with said plug means and said insulating material for compacting said insulating material and for effecting an intimate mechanical bond between said sheath and said plug means.

3. A method of manufacturing a non-welded thermocouple assembly having a plurality of dissimilar refractory metal thermocouple wires and of a type for use in high temperature environments comprising the steps of:

providing longitudinal passageway means in an electrically conductive plug means which passageway means is formed so as to easily receive respective end portions of said thermocouple wires;

inserting said respective end portions of said thermocouple wires into said passageway means of said plug means to effect a predetermined longitudinal alignment of said wires with said plug means;

swaging an adjacent surrounding portion of said plug means into intimate mutual engagement with said aligned plurality of thermocouple wires to form a thermoelectric junction between said wires;

placing a quantity of electrical insulating material of a refractory composition about the remaining portions of said wires to complete a thermocouple subassembly;

inserting said thermocouple subassembly into a hollow electrically conductive refractory sheath with said plug means positioned adjacent one end thereof and with said wires being maintained in spaced relation to each other and said sheath by said insulating material;

and affixing a refractory type end closure cap to said one end of said sheath to complete a protective enclosure for said thermocouple subassembly.

4. The method of claim 3 and further including the steps of:

placing a quantity of said refractory insulating material about said plug means to maintain said plug means in spaced, electrically insulated relation to said sheath;

and swaging said sheath into intimate engagement with said insulating material for intimately confining and insulating material and said thermocouple subassembly within said sheath.

References Cited

UNITED STATES PATENTS

| 1,660,504 | 2/1928 | Grubb | 136—233 |
|---|---|---|---|
| 2,012,112 | 8/1935 | States | 136—229 |
| 2,381,819 | 8/1945 | Graves et al. | 29—573 X |
| 3,343,589 | 9/1967 | Holzl | 29—573 X |
| 3,353,260 | 11/1967 | Davis et al. | 29—573 |

FOREIGN PATENTS 854,570  11/1960  Great Britain.

PAUL M. COHEN, Primary Examiner

U.S. Cl. X.R.

29—518, 630